United States Patent [19]

Bergman

[11] Patent Number: 4,527,159
[45] Date of Patent: Jul. 2, 1985

[54] THRESHOLD CIRCUIT FOR RADAR VIDEO DATA

[75] Inventor: Jan Bergman, Haaksbergen, Netherlands

[73] Assignee: Hollandse Signaalapparaten, B.V., Hengelo, Netherlands

[21] Appl. No.: 324,231

[22] Filed: Nov. 23, 1981

[30] Foreign Application Priority Data

Dec. 22, 1980 [NL] Netherlands ............... 8006950

[51] Int. Cl.³ .................................. G01S 7/02
[52] U.S. Cl. ....................... 343/7 A; 343/5 FT
[58] Field of Search .................. 343/5 CF, 7 A

[56] References Cited

U.S. PATENT DOCUMENTS

| 3,701,149 | 10/1972 | Patton et al. | 343/7 A X |
| 3,778,825 | 12/1973 | Ares et al. | 343/7 A |
| 3,995,270 | 11/1976 | Perry et al. | 343/7 A |
| 4,213,127 | 7/1980 | Cole | 343/5 CF |
| 4,249,177 | 2/1981 | Chen | 343/7 A |
| 4,266,279 | 5/1981 | Hines | 343/5 CF X |
| 4,386,353 | 5/1983 | Bleijerveld et al. | 343/7 A |

FOREIGN PATENT DOCUMENTS 0062519 10/1982 European Pat. Off. ......... 343/5 CF

Primary Examiner—T. H. Tubbesing
Attorney, Agent, or Firm—Robert J. Kraus

[57] ABSTRACT

A threshold circuit comprises a shift memory (1) supplied with sampled and digitized radar video data; two adder circuits (2, 3) connected to the first and the last elements of the shift memory (1); and a selection circuit (5) for passing the greater of the two output signals from the adder circuits (2, 3). The output signal of the selection circuit (5) represents a first threshold value for the radar video data from the center element of the shift memory (1). The threshold circuit further comprises a noise level detector (6) connected to the selection circuit (4). The output signal of noise level detector (6) represents a second threshold value for the radar data from the center element of the shift memory (1). A comparator (10) and a gate circuit (13) are used to obtain the radar video data from the shift memory (1), when the amplitude of the video data is in excess of the greater threshold value.

3 Claims, 3 Drawing Figures

THRESHOLD CIRCUIT FOR RADAR VIDEO DATA

BACKGROUND OF THE INVENTION

The invention relates to a threshold circuit for radar video data. Such data in general originates from fixed or moving targets and from various categories of clutter and contains a certain amount of noise. The present invention has for its object to provide a threshold circuit for suppressing the noise, as well as the clutter, extending over a large number of range quants, particularly rain clutter.

SUMMARY OF THE INVENTION

According to the invention, the threshold circuit comprises: a shift memory consisting of at least 2k+1 elements, which memory is supplied with sampled and digitized radar video data; two adder circuits connected to the first and the last k elements of the shift memory; a selection circuit connected to the adder circuits, which selection circuit passes the greater of the two output signals from the adder circuits, whereby the passed output signal represents a first threshold value for the radar video data from the center element of the shift memory; a noise level detector connected to the selection circuit, the output signal of the noise level detector representing a second threshold value for the radar data from the center element of the shift memory; a comparator for determining the greater of the output signals from the selection circuit and the noise level detector; switching means for passing the greater of the two threshold values under control of the comparator output signal; and a gate circuit for passing the radar video data from the shift memory, corrected by the second threshold if the amplitude of the video data is in excess of the greater threshold value.

If such a threshold circuit is utilized in a pulse radar equipped with an n-point FFT processor, the shift memory is supplied with radar video data per range quant for each of the n frequency output signals of this processor. Therefore, according to the invention, the shift memory consists of n submemories, and the radar video data supplied via n frequency output channels of the FFT processor enters the shift memory serially, establishing for each of the n frequency output channels a first and a second threshold value. The gate circuit passes the radar video data stored in the shift memory and supplied via the relevant frequency output channel, in so far as the amplitude of the video data is in excess of the greater of the threshold values established for the frequency output channel and is corrected by the second threshold value established for the respective frequency channel.

BRIEF DESCRIPTION OF THE DRAWING

The invention will now be described in greater detail with reference to the accompanying drawing, of which.

DESCRIPTION OF THE PREFERRED EMBODIMENTS

Figure 1:
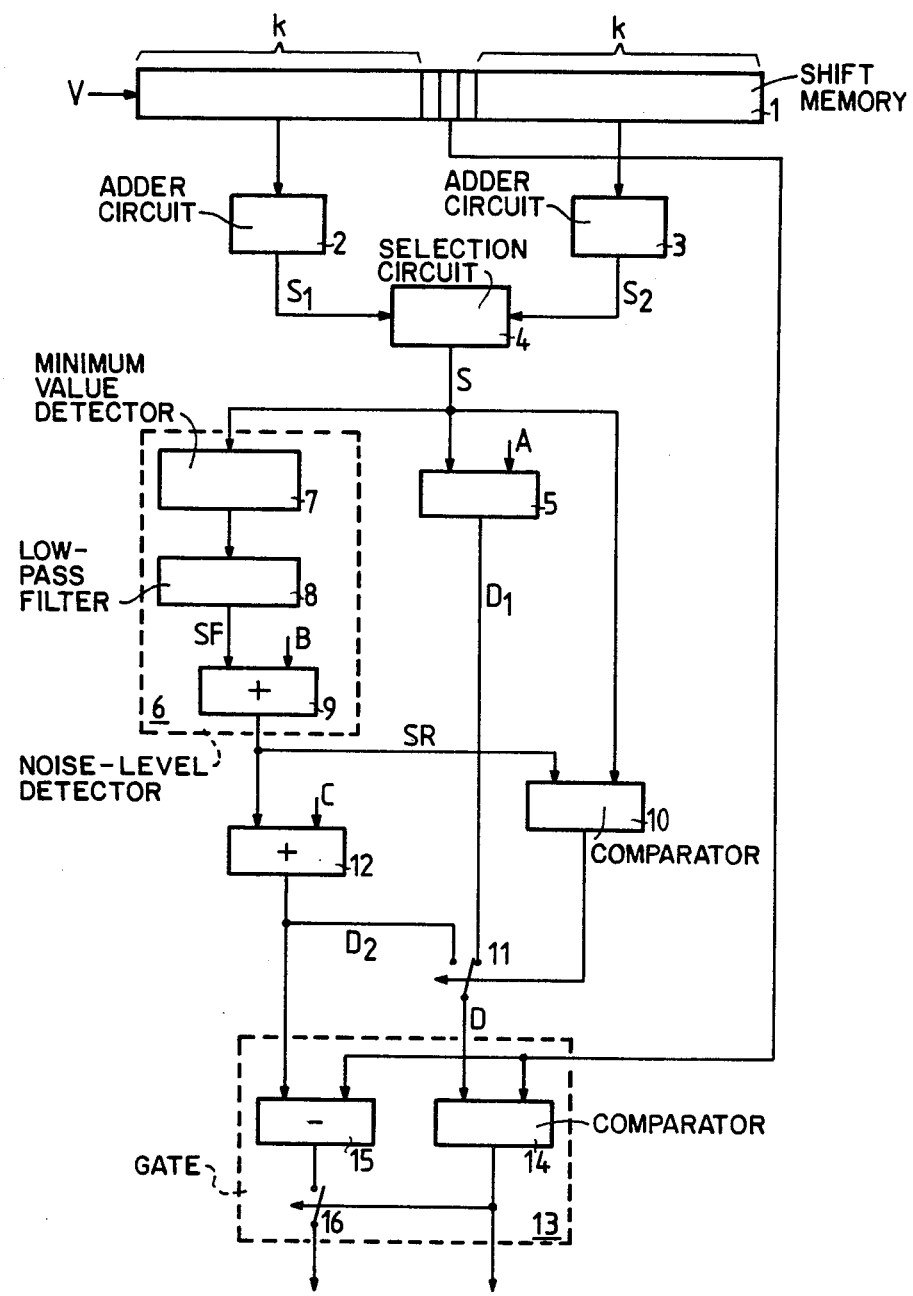
FIG. 1 is a block diagram of the threshold circuit according to the invention.

In FIG. 1 the shift memory, denoted by 1, comprises 2k+3 elements. Connected to the first and the last k elements of the shift memory are adder circuits 2 and 3, respectively. Denoting the content of memory element i by $a_i$, the output signals of adder circuits 2 and 3 can be expressed by:

$$S_1 = k \cdot \sum_{i=1}^{k} a_i \text{ and } S_2 = k \cdot \sum_{i=k+4}^{2k+3} a_i,$$

where k is a constant. A selection circuit 4 determines and passes the greater of these sum values, which is denoted by S.

Figure 2:
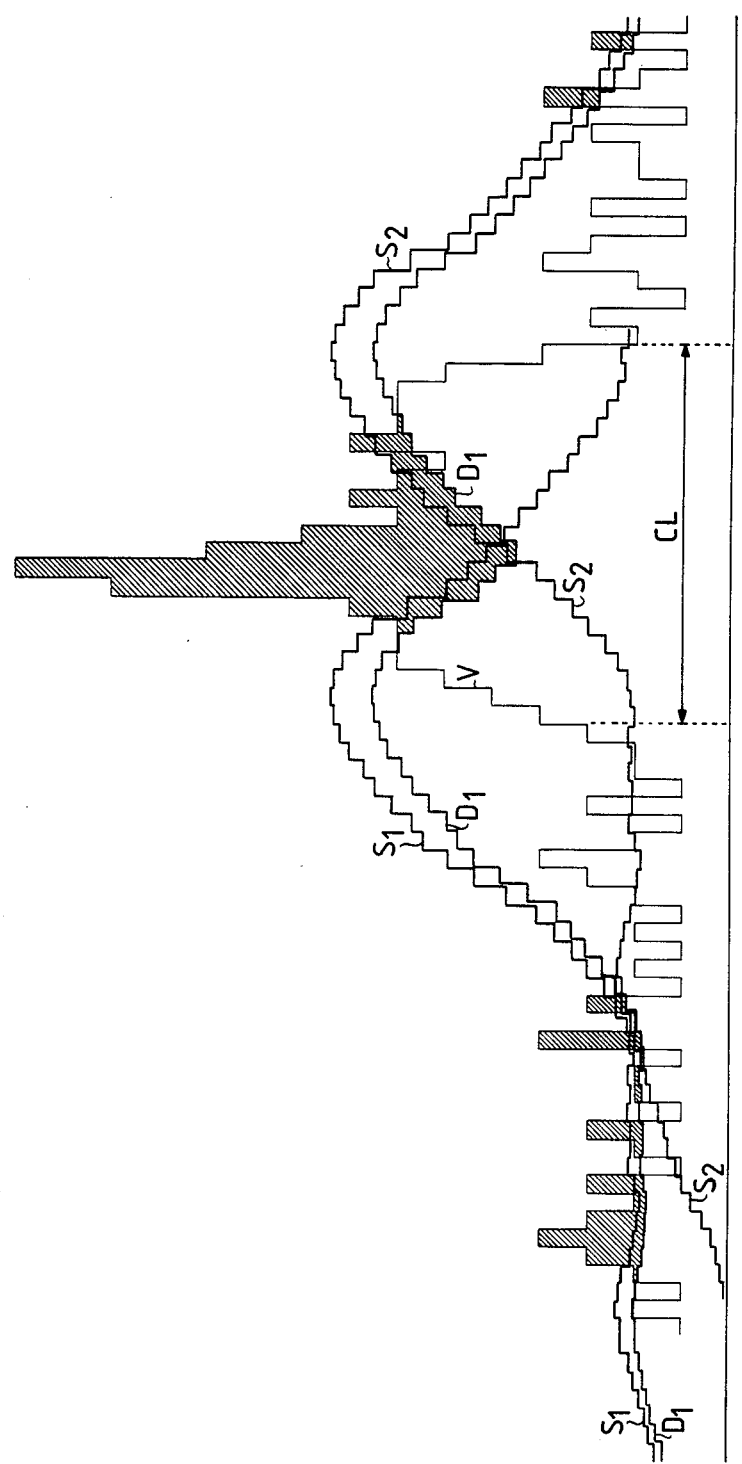
FIG. 2 is a diagram, illustrating the operation of a part of the threshold circuit.

FIG. 2 shows a logarithmically amplified, sampled and digitized unipolar radar video signal V. This signal is supplied to shift memory 1 and shifted through this memory at a frequency corresponding with the division of the measuring range into range quants; the content of each element in the shift memory thus corresponds with the signal received within a range quant. Also shown in FIG. 2 are the signals $S_1$ and $S_2$; signal S is represented by the envelope of $S_1$ and $S_2$. From signal S the adder circuit 5 derives a first threshold value $D_1 = S + A$, where A is a constant. Threshold $D_1$ s also called a "fast" threshold, expressing that $D_1$ is fast in reacting to an increase in the strength of the received signal, such that a clutter area CL, as shown in FIG. 2, extending over numerous range quants is completely suppressed by threshold $D_1$. The target echo and noise signals, shown shaded in FIG. 2, exceed the fast threshold $D_1$.

The threshold circuit of FIG. 1 further comprises a noise level detector 6 connected to selection circuit 4. Detector 6 consists of a minimum value detector circuit 7 for determining the minimum value of signal S per azimuth scan, a low-pass filter 8 connected to circuit 7, and an adder 9. The output signal of circuit 7 follows the input signal, provided the amplitude of the latter signal is smaller than the amplitude of the existing output signal; otherwise the output signal of circuit 7 remains unchanged. This process is repeated each successive radar scan. Thus, with each scan the output signal of minimum value detector circuit 7 slews to the minimum value of S and retains this value. The output signal of circuit 7 is fed to low-pass filter 8; this is a recursive filter, in which the output signal is incremented by one unit when the applied signal is greater than the output signal and decremented by one unit when the applied signal is smaller than the output signal. In this way a "slow threshold" is obtained. This is the threshold that assumes the average noise level. Output signal SF of filter 8 is supplied to adder 9 to produce signal SR by incrementing the filter output signal by an adjustable constant B. This constant is so selected that, in the presence of noise alone, the SR signal becomes approximately equal to the peak value of the S signal.

The S signal from selection circuit 4 and the SR signal from noise level detector 6 are fed to a comparator 10. The output signal of comparator 10 is used as a control signal for switch 11. When $S \geq SR$, the fast threshold $D_1$ passes through switch 11. In case $S < SR$, the switch passes the $D_2$ signal; $D_2$ represents the slow threshold obtained from the SR signal by raising SR with an adjustable constant C in adder 12. Constant C ensures that the slow threshold level is just above the video noise.

The threshold value, passed through switch 11, is denoted by D and is supplied to gate 13. If the video data from the center element of the shift memory is greater than threshold D the gate passes this video data and is reduced by the value of threshold $D_2$. Gate 13 comprises a comparator 14, a subtractor 15 and a switch 16. In comparator 14 the video data from the shift memory is compared with threshold D; if the video data is in excess of threshold D, switch 16 closes and the video data, reduced by $D_2$ in subtracter 15, is passed.

Should the video signal V be processed in a linear instead of in a logarithmic form, before being supplied to the shift memory, adders 5, 9 and 12 should be replaced with multipliers for performing the operations $D_1 = S \cdot A$, $SR = SF \cdot B$ and $D_2 = SR \cdot C$. In addition, subtracter 15 should be replaced with a divider.

Figure 3:
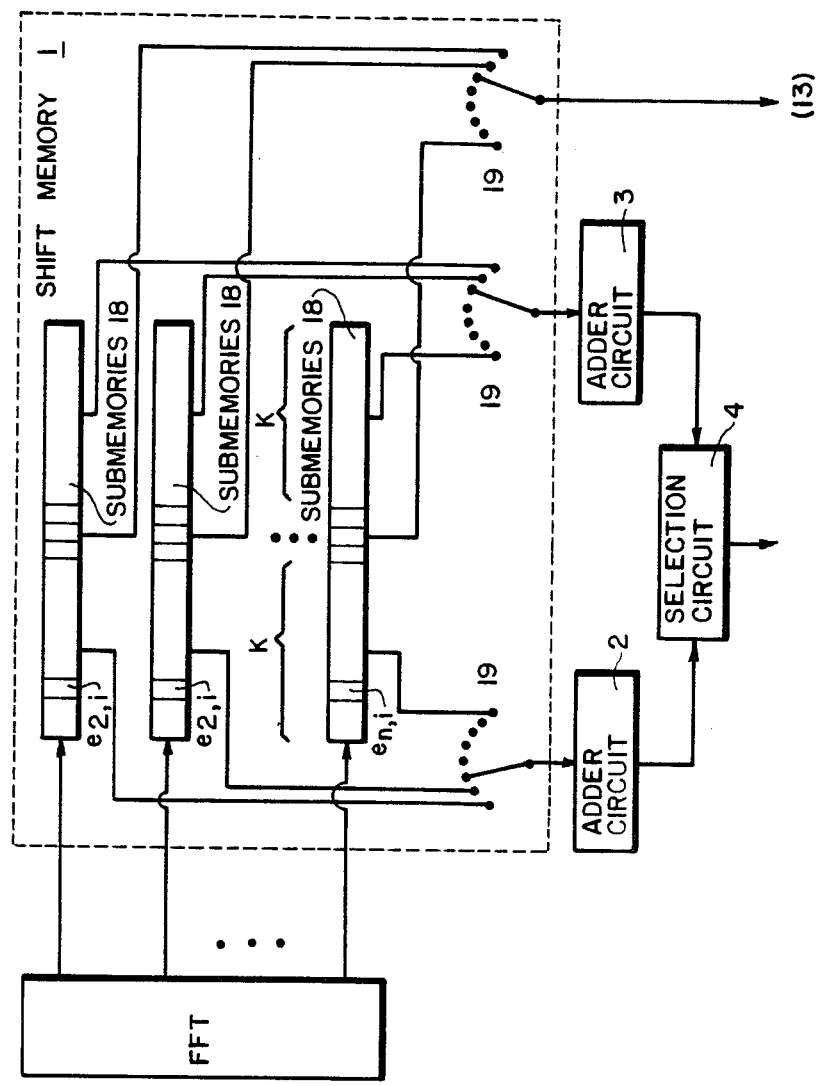
FIG. 3 is a block diagram of a part of another embodiment of the threshold circuit.

With the use of the above-described threshold circuit in a pulse radar apparatus having an n-point FFT processing unit, a separate threshold value should in general be selected for each of the n frequency output signals of this processing unit, while for each range quant and for each of the frequency output signals the gate 13 should pass video data. As illustrated in FIG. 3, this only requires that shift memory 1 consists of n submemories 18 connected to the n FFT frequency output channels and that the video information be processed in the remaining part of the threshold circuit by the use of time-sharing means such as switches 19.

I claim:

1. A threshold circuit comprising:
   (a) a shift memory including k first elements, at least one center element, and k last elements, for receiving radar video data;
   (b) first and second adder circuits electrically-connected to the shift memory for producing, from the data in the k first elements and in the k last elements, signals representing first and second sums, respectively;
   (c) a selection circuit electrically-connected to the first and second adder circuits for passing the signal representing the larger of the first and second sums, said larger sum representing a first threshold value for the data in the at least one center element of the shift memory;
   (d) a noise level detector electrically-connected to the selection circuit for producing an output signal representing a second threshold value for the data in the at least one center element of the shift memory;
   (e) a comparator electrically-connected to the selection circuit and to the noise level detector for determining the greater of the threshold values;
   (f) switching means electrically-controlled by the comparator for passing a signal representing the greater of the two threshold values; and
   (g) a gate circuit electrically-connected to the shift memory for decreasing the value of data from said shift memory by the second threshold value, and for passing the decreased value if the respective data from the shift memory has a value greater than the threshold value represented by the signal passed by the switching means.

2. A threshold circuit as in claim 1, characterized in that the noise level detector comprises:
   (a) a minimum value detector for determining, for each azimuth scan, the minimum value of the signal from the selection circuit; and
   (b) a low-pass filter connected to the minimum value detector output.

3. A threshold circuit as in claim 1 or 2 for use with a pulse radar apparatus having a n-point FFT processing unit, characterized in that the shift memory comprises n submemories, each having at least $2k+1$ elements, for receiving video data from n frequency output channels of the FFT processing unit, and means for successively applying the radar video data from the submemories to the adder circuits and the gate circuit.

* * * * *